United States Patent [19]
Carrier

[11] Patent Number: 6,029,781
[45] Date of Patent: Feb. 29, 2000

[54] MULTI-DISC BRAKE

[75] Inventor: Graham Carrier, West Midlands, United Kingdom

[73] Assignee: Dunlop Limited, London, United Kingdom

[21] Appl. No.: 08/998,349

[22] Filed: Dec. 24, 1997

[30] Foreign Application Priority Data

Dec. 27, 1996 [GB] United Kingdom ................... 9626957

[51] Int. Cl.$^7$ ............................. F16D 65/84; F16D 55/36
[52] U.S. Cl. ........................ 188/71.5; 188/18 A; 188/234
[58] Field of Search ................. 188/71.5, 18 A, 188/73.2, 73.1, 218 XL, 250 B, 250 G, 217, 366–367, 234; 192/70.21, 70.16; 301/608, 6.2

[56] References Cited

U.S. PATENT DOCUMENTS

| | | | |
|---|---|---|---|
| 3,653,472 | 4/1972 | Dowell | 188/217 |
| 4,117,912 | 10/1978 | Ruppe, Jr. | |
| 4,878,563 | 11/1989 | Baden et al. | 188/71.5 |
| 5,437,352 | 8/1995 | Harker | |
| 5,540,305 | 7/1996 | Hammond et al. | 188/71.5 |

FOREIGN PATENT DOCUMENTS

| | | |
|---|---|---|
| 0 239 431 | 9/1987 | European Pat. Off. |
| 1 402 534 | 8/1975 | United Kingdom |
| 2 161 560 | 1/1986 | United Kingdom |
| 2 284 027 | 5/1995 | United Kingdom |

*Primary Examiner*—Douglas C. Butler
*Attorney, Agent, or Firm*—Young & Thompson

[57] ABSTRACT

A multi-disc brake includes a plurality of stator discs, a plurality of rotor discs interleaved with the stator discs, a torque tube relative to which stator discs are axially slidably keyed, brake-actuating thrust members for applying an axial thrust to an end stator disc and a reaction member which provides an abutment for the other end stator disc. This other end stator disc includes an element of friction material having a first face which engages a rotor disc for dissipation of energy when axial thrust is applied to the assembly of rotor and stator discs and a second face supported by a substantially rigid backing member. The backing member is supported by the torque tube in an arrangement which prevents rotation of the backing member relative to the torque tube, and the backing member also includes location member which extends axially from that face of the backing member which supports the stator disc friction element. A radially outer region of the stator disc friction element includes relieved regions slots for example, circumferentially spaced relative to the longitudinal axis of the torque tube. The location member is engaged in the relieved regions so that torque load applied to the stator friction element is transmitted to the torque tube.

7 Claims, 4 Drawing Sheets

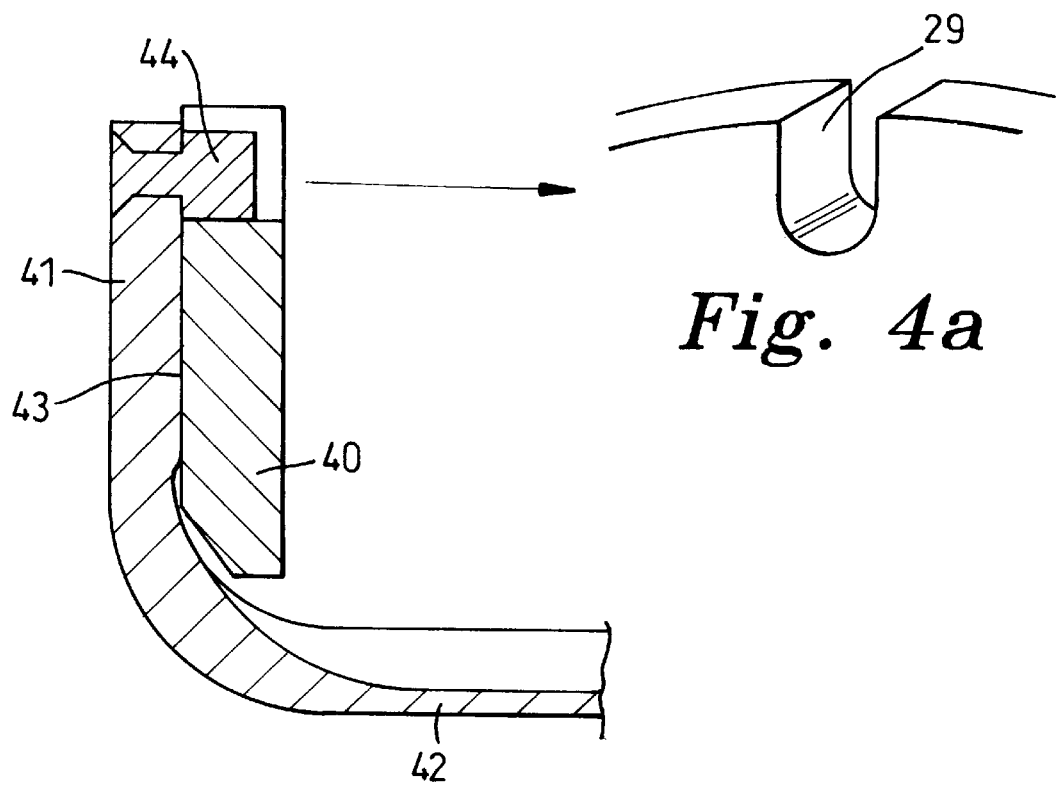
Fig. 4
Fig. 4a
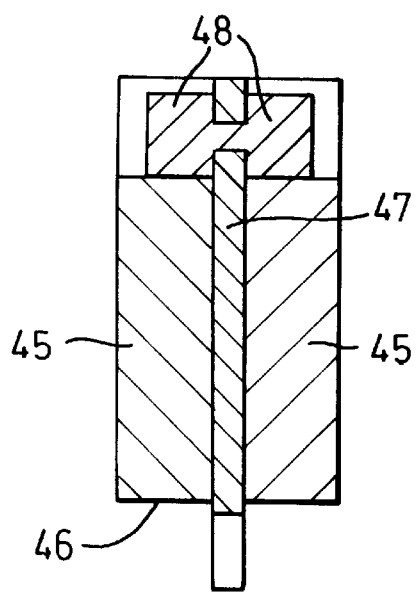
Fig. 5

MULTI-DISC BRAKE

This invention relates to a multi-disc brake and in particular, though not exclusively, to a multi-disc brake for use in aircraft. The invention may be applied to, for example, a multi-disc brake of the type comprising friction discs of carbon composite material or to a brake of the so-called steel type in which steel discs each carry elements of wear-resistant friction material.

An example of a known aircraft disc brake assembly of a multi-disc type is as shown in the accompanying FIGS. 1 and 2 in which FIG. 1 is a sectional elevation of half a brake assembly, in a plane parallel to and coincident with the axis X—X about which the brake assembly is symmetrical, and FIG. 2 is an end elevation of the brake assembly shown in FIG. 1, the left hand half being a section on Y—Y to show the brake assembly with the brake actuators removed.

The disc brake is of the steel type and comprises a non-rotatable annular hub 1 having secured thereto a torque tube 2 by means of bolts 2'. The individual discs of an assembly of annular stator disc members 3,3a, 3b are axially slidably keyed, each at its radially inner periphery, to splines 4 on the torque tube 2. A corresponding series of annular rotor disc members 5 are interleaved with the stator members 3 and axially slidably keyed, each at its radially outer periphery 6, to a wheel (not shown) for rotation therewith. At one, a distal, end of the torque tube 2 an annular flange 7 is secured thereto by bolts 8 for engagement with the axially outermost stator member 3a, to constitute a stop for that stator member Twelve brake actuators 9 in the form of hydraulic piston and cylinder assemblies are united at equally circumferentially spaced positions at the other end of the torque tube 2 for applying a brake-actuating thrust to the axially innermost stator member 3b. The piston and cylinder assemblies 9 are circumferentially interconnected by a piston housing in the form of an integral flange member 9' which in turn is formed integrally with the aforedescribed annular hub 1.

Thrust transmission means 10 for transmitting thrust from the actuators to the axially innermost stator member 3b comprises first and second concentric and radially spaced metal annuli (11,16) interconnected by a deformable first connecting means 12, 13, 17 in the form of a pair of frusto-conical metal webs. The piston 14 of each piston and cylinder assembly 9 is arranged to engage the first annulus 11 to transmit brake applying thrust thereto.

For addressing the ever-present requirement to try to reduce the size and weight of aircraft components, and thus operating costs, it would be advantageous to reduce the overall axial length of the brake.

Operating costs would also be reduced if the friction discs could be worn down to a smaller thickness than at present. In the case of stator discs the minimum acceptable thickness must take account of the shear strength limitations of a notched radially inner periphery of a disc where it slides on the torque tube keyways.

The present invention has as one of its objects; the provision of a multi-disc brake having an in-proved means for the location of a stator disc. Another object is the provision of an improved stator disc location which permits a reduction in the axial length of the brake.

The present invention provides a multi-disc brake of the kind comprising a plurality of stator discs, a plurality of rotor discs interleaved with the stator discs, a torque tube relative to which stator discs are axially slidably keyed, brake-actuating thrust means for applying an axial thrust to an end stator and a reaction member which provides an abutment for the other end stator, wherein a stator disc comprises an element of friction material having a first face for abutting a rotor disc for dissipation of energy when axial thrust is applied to the assembly of rotor and stator discs and a second face supported by a substantially rigid backing member, said backing member being supported by the torque tube in an arrangement which prevents rotation of the backing member relative to the torque tube, said backing member comprising location means extending axially from that face of the location means which supports the stator disc friction element, a radially outer region of the stator disc friction element comprising relieved regions circumferentially spaced relative to the longitudinal axis of the torque tube and said location means being received in said relieved regions whereby torque load applied to the stator friction element is transmitted to the torque tube.

The relieved regions of a stator disc friction element and especially but not exclusively an end stator disc, may be located at a radially outer region which lies either wholly or substantially radially outwards of the disc surface region which frictionally engages a rotor disc when the assembly of discs is compressed axially.

The relieved regions preferably lie in the outermost twenty percent, more preferably the outermost ten percent, of the radial extent of the stator disc friction element, said radial extent in the case of an annular disc being the difference between the inner and outer radii of the disc friction element.

The radially outer relieved regions may be notches and may be of a form similar to those provided conventionally at a radially inner periphery of a stator disc, or some or all of the relieved regions of an element may be in the form of discrete apertures, i.e. holes. Relieved regions may extend axially through the entire thickness of the friction element, or only through a part of that thickness.

The backing member which supports an end stator friction element at the end of the assembly of discs remote from the brake-actuating thrust means may be a member, e.g. an annular member, which surrounds an end region of the torque tube and is supported axially by an end formation of the torque tube. Alternatively the backing member may be comprised by an end region of the torque tube and thus be inherently prevented from rotating relative to the torque tube.

One or both of the radially inner edge of the friction element and any backing member which is a part of the stator disc may be of a tapered form when considered in longitudinal cross-section whereby the diameter of the inner edge is greater at one axial end than at the other axial end.

The backing member may be a metal member, e.g. steel. The friction element of a stator disc may be of a conventional brake friction material, e.g. steel or carbon composite. It nay comprise material of a laminated type.

Embodiment of the present invention will no be described, by way of example, with reference to the diagrammatic Drawings, in which:

FIG. 4 is a view similar to that of FIG. 3 showing a second embodiment of the invention, and FIG. 5 is a longitudinal section of part of a double sided stator of a brake of the invention.

Figure 1:
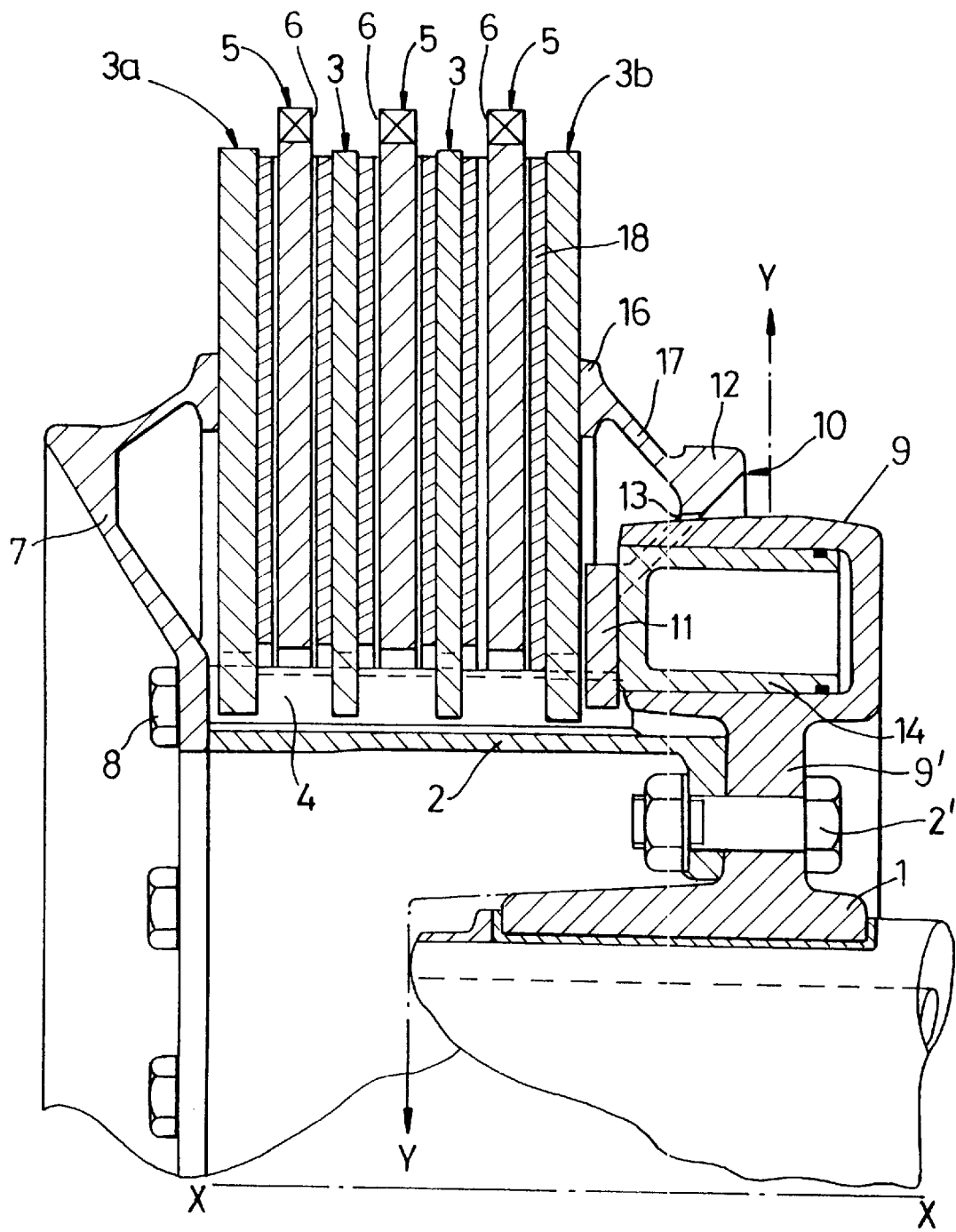
FIGS. 1–2 show a conventional multi-disc type of aircraft disc brake assembly.
Figure 2:
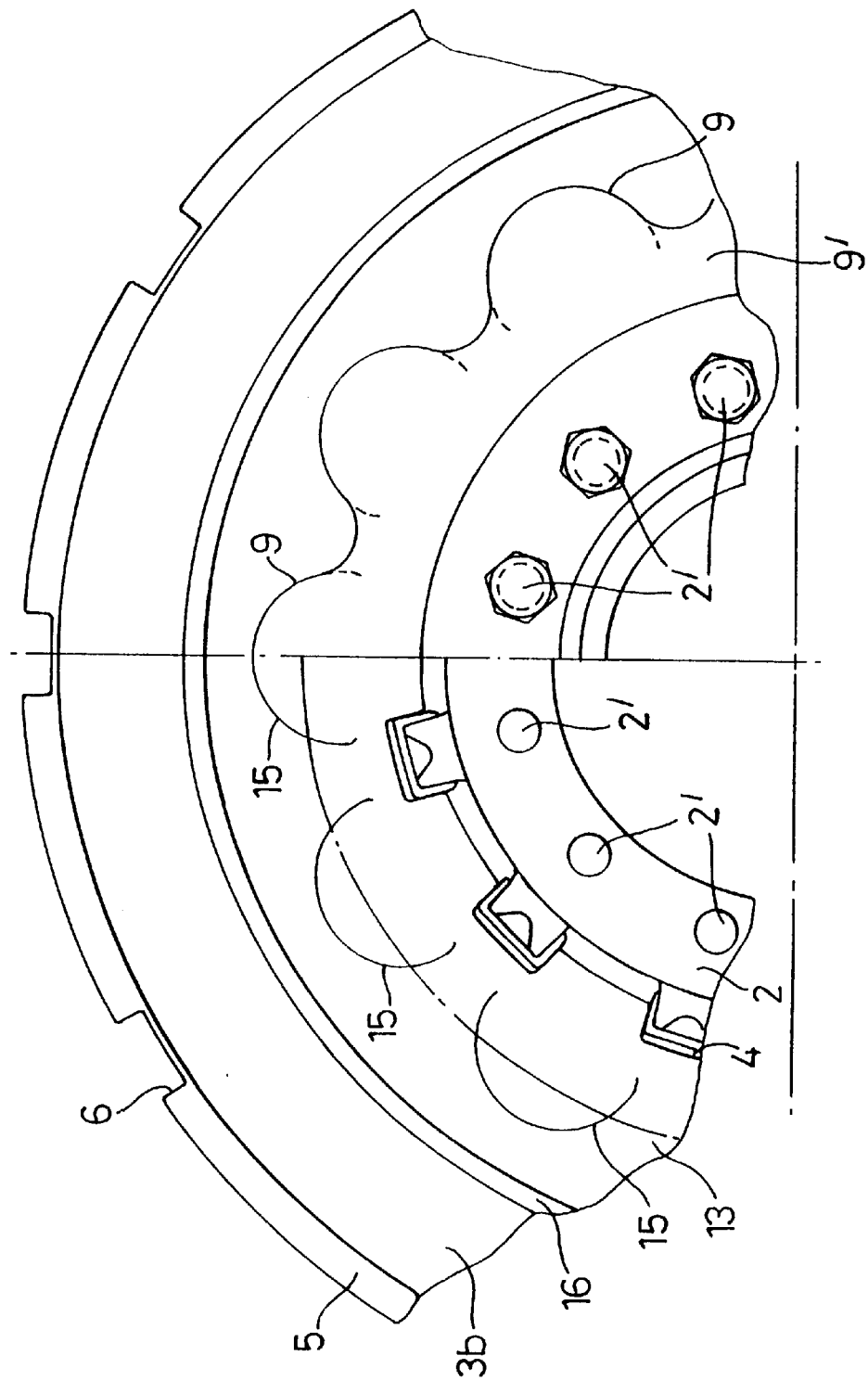

In a first embodiment, a brake 20 of the invention is constructed substantially as shown in FIGS. 1 and 2 with the exception of the reaction member end region 21 of the torque tube and the end stator disc 26 at that end region.

The torque tube end region 21 comprises an annular dislike flange portion 22 interconnected integrally with a conventional splined region 23 by a flared, bell mouth-shaped section 24.

The flange portion 22 provide location and support for annular steel disc 25 that serves as a backing member for the friction element 26 of the end stator. The backing member 25 is secured to the flange portion by a series of circumferentially spaced bolts 27.

The radially outer region of the backing member 25 has secured thereto a series of circumferentially spaced lugs 30 which extend axially in a direction towards the stator disc friction element 26.

The radially outer periphery 28 of the stator disc element 26 has a series of circumferentially spaced notches 29 (see FIG. 3a) shaped and positioned to locate closely with the lugs 30. The face 32 of the stator element 26 nearest the flange region 22 has a series of circumferentially spaced blind bores 31 at positions aligned with that bolts 27 so that that face 32 can bear firmly against and be supported by the backing member 25.

The radially inner periphery 33 of the stator element 26 has a frusto conical portion 34 which tapers outwards in a direction towards the flange portion 22.

The radially inner periphery 35 of the backing member 25 also is of a frusto conical shape.

The radially outer location and support of the stator element 26 avoids the conventional need for the torque tube splines 36 to extend axially the full length of the stack of discs.

The axially compact construction of the torque tube in this embodiment also arises because of the size and shape of the inner periphery of the stator element 26 and backing member 25. This allows a strong, outwardly flared, load-transmitting interconnection section 24 of the torque tube to be accommodated without any need to extend axially beyond the flange portion 22, in contrast to a typical prior art construction having a load-transmitting transmitting flange 7 as shown in FIG. 1.

Figures 3, 3A:
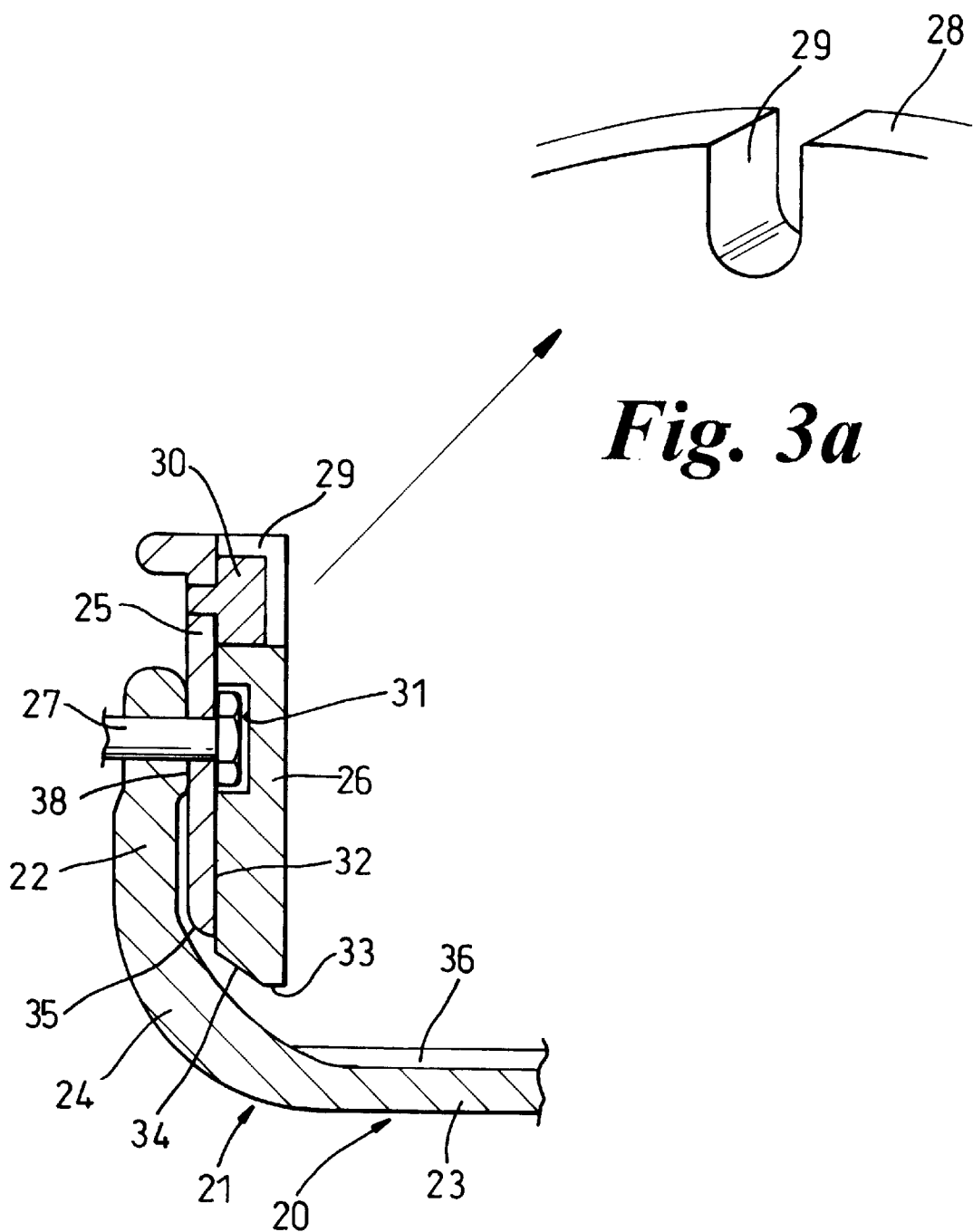
FIG. 3 is a longitudinal section of part of a the tube and end stator of a brake of the invention.
FIG. 3a shows a detail of the end stator of FIG. 3.

FIG. 4 shows a second embodiment of the invention in which a stator element 40 is substantially the same as the aforedescribed element 26 of FIG. 3 but is mounted directly on the end flange section 41 of the torque tube 42. The end flange 41 has a support face 43 of greater planar extent in a radial direction than the support face region 38 of FIG. 3 whereby the support face 43 provides a support to the stator element which corresponds to the support provided by the backing element 25 of FIG. 3. Lugs 44 are secured to the end flange 41 and locate closely with end disc notches 29.

The radially outer location and support of a stator element may be provided in the context of an intermediate double sided stator as shown in FIG. 5. The stator elements 45 each correspond with the aforedescribed element 26 of FIG. 3 apart from having a cylindrical inner periphery 46. The backing member 47 carries at the radially outer region a series of circumferentially spaced lugs 48 which are each of a double sided form so as each to locate with the two stator elements 45. The radially inner region of the backing member 47 is provided with a notched profile 48 to enable the backing member to slide axially on the splines of a torque tube whilst being held against rotation.

In each of the embodiments described above it is preferred that a lug 30, 44, 48 extends axially through substantially the whole thickness of the stator disc, this minimizing the risk of delamination or other damage to the disc material.

I claim:

1. A multi-disc brake comprising:

a torque tube having surface portions defining slide key means;

a substantially rigid backing plate fixed with respect to the torque tube in the region of one of the ends of the torque tube and extending radially outwardly from the torque tube;

a plurality of locating elements spaced around the torque tube axis and projecting from the backing plate in the direction of said axis;

a plurality of stator discs located along the torque tube and including an end stator disc and further stator discs between the end stator disc and the other end of the torque tube;

a plurality of rotor discs interleaved with the stator discs; and actuator means located at said other end of the torque tube for applying thrust to the discs for producing frictional braking between the discs and for torque to be transmitted from the rotor discs to the stator discs;

the said further stator discs beings engaged with said slide key means for movement relative to the torque tube in the direction of said axis and for transmitting torque to the torque tube via the slide key means, and the end stator disc comprising a friction member which is made of frictionable material, which has a face engaged with said backing plate and which has portions defining a plurality of notches open at and extending in from a periphery of the end stator disc at positions spaced around said axis, said plurality of locating elements each being at a distance from said axis for being located adjacent to and just inwards of the periphery of said end stator disc and being engaged in respective ones of said notches for torque to be transmitted from said end stator disc to the backing plate via the locating elements.

2. A multi-disc brake in accordance with claim 1, wherein said backing plate surrounds an end region of the torque tube and is supported axially by an end formation of the torque tube.

3. A multi-disc brake in accordance with claim 2, wherein a radially inner edge of the backing plate is of a tapered form.

4. A multi-disc brake in accordance with claim 1, wherein said backing plate comprises an end region of the torque tube.

5. A multi-disc brake in accordance with claim 4, wherein a radially inner edge of the friction element is of a tapered form.

6. A multi-disc brake in accordance with claim 1, wherein the friction member comprises laminated carbon composite material.

7. A multi-disc brake comprising:

a torque tube having surface portions defining slide key means;

an annular backing plate having a plane face extending radially outwardly from the torque tube and fixed with respect to the torque tube by way of an outwardly flared portion of one of the ends of the torque tube;

a plurality of locating elements spaced around the torque tube axis and projecting from the backing plate in the direction of said axis;

a plurality of annular stator discs made of frictionable material and located side by side along the torque tube, the stator discs including an end stator disc having a face engaged with the plane face of said backing plate, and further stator discs between the end stator disc and the other end of the torque tube;

a plurality of rotor discs interleaved with the stator discs; and actuator means located at said other end of the torque tube for applying thrust to the discs for producing frictional braking between the discs and for torque to be transmitted from the rotor discs to the stator discs;

the said further stator discs beings engaged with said slide key means for movement relative to the torque tube in the direction of said axis and for transmitting torque to the torque tube via the slide key means; and the end stator disc being located around said outwardly flared portion of one of the ends of the torque tube, having a tapered inner periphery TO accommodate said flared portion, having an outer diameter substantially equal to that of the backing plate, and having portions defining a plurality of notches open at and extending in from a periphery of the end stator disc at positions spaced around said axis;

said plurality of locating elements each being at a distance from said axis for being located adjacent to and just inwards of the periphery of said end stator disc and being engaged in respective ones of said notches for torque to be transmitted from said end stator disc to the reaction member via the locating elements.

* * * * *